United States Patent

Brown et al.

[11] Patent Number: 6,042,659
[45] Date of Patent: Mar. 28, 2000

[54] METHOD OF COATING THE SEAMS OF A WELDED TUBE

[75] Inventors: Curt Brown, Park Forest; Theodore Krengel, Flossmoore, both of Ill.

[73] Assignee: The IDOD Trust, Grant Park, Ill.

[21] Appl. No.: 09/106,397

[22] Filed: Jun. 29, 1998

[51] Int. Cl.[7] ........................................................ C21D 9/08
[52] U.S. Cl. .......................... 148/519; 148/520; 148/521; 228/150; 228/199; 228/202; 228/223
[58] Field of Search ..................... 148/519, 520, 148/521; 228/147, 150, 199, 202, 223

[56] References Cited

U.S. PATENT DOCUMENTS

| | | | |
|---|---|---|---|
| 4,027,367 | 6/1977 | Rondeau | 428/652 |
| 4,135,013 | 1/1979 | Yamaguchi et al. | 228/199 |
| 4,273,988 | 6/1981 | Iceland et al. | 219/130.51 |
| 5,035,042 | 7/1991 | Maitra et al. | 228/202 |
| 5,100,617 | 3/1992 | Kiilunen et al. | 420/470 |
| 5,245,153 | 9/1993 | Singer et al. | 219/76.15 |
| 5,272,305 | 12/1993 | Endo et al. | 219/145.23 |
| 5,314,108 | 5/1994 | Takikawa et al. | 148/521 |
| 5,344,062 | 9/1994 | Krengel et al. | 228/150 |
| 5,474,227 | 12/1995 | Krengel et al. | 228/150 |
| 5,514,422 | 5/1996 | McCune | 427/449 |
| 5,732,874 | 3/1998 | Borzym et al. | 228/147 |

Primary Examiner—George Wyszomierski
Attorney, Agent, or Firm—Howard & Howard

[57] ABSTRACT

An improved method of coating the welded seam of a metal tube comprising heating the weld area only of the metal tube to a first temperature which is less than the melting temperature of the protective metal coating, applying the protective metal coating over the seam and heating the entire tube preferably with a full body induction coil to a second temperature which is at least equal to the difference between the first temperature and the melting temperature of the metal coating, such that the temperature of the seam area is heated to a temperature equal to or greater than the melting temperature of the metal coating, whereby the metal coating firmly adheres to the welded seam. Where the method of this invention is utilized to apply a protective metal coating over the exterior surface of the welded seam, the protective metal coating is preferably applied by thermally spraying molten metal coating material over the seam and the coating material metallurgically bonds with the seam during the final heating step. In the preferred method, a flux is applied to the exterior surface of the seam prior to applying the coating material. In the method of applying a protective metal coating to the interior surface of the seam, the protective metal coating material is preferably applied by spraying the interior surface with metal coating material in the form of a fine metal powder and liquid flux and the entire tube is heated with the seam located in a lower portion of the tube.

36 Claims, 2 Drawing Sheets

METHOD OF COATING THE SEAMS OF A WELDED TUBE

BACKGROUND OF THE INVENTION

The present invention relates to improved methods of coating the outer and inner exposed surfaces of the seam of a welded metal tube with a protective metal coating. The tube may be formed from a coated metal strip such as zinc coated steel. However, the coating on the surfaces of the seam will burn off or vaporize during welding because the melting temperature of the coating, such as zinc or aluminum and their alloys, has a much lower melting temperature than the tube which is generally formed of steel. More specifically, the improved method of this invention utilizes a unique heating and coating process which results in an improved bond between the protective metal coating and the exposed seam surface which extends the life of the tube.

Methods of continuous or in-line forming of seamed metal tubes such as steel from a continuous strip are well known. In a conventional tube forming mill, the strip is rolled to form an open seam tube having nearly abutting edges located at the top of the tube. The edges are then welded together by one of several conventional methods which generally include heating the edges and then either forging the edges together with squeeze rolls and/or flux welding a seam. The edges of the tube may be heated, for example, by resistance welding, electric arc or by high frequency induction welding. High frequency induction welding is a form of electronic resistance welding, wherein the open seam tube is received through an electric work coil which creates a strong magnetic field, which in turn induces a current to flow around the tube and in the "Vee" formed as the edges of the strip are welded. An impeder is generally located within the tube, which forces the current down the nearly abutting edges of the open seam tube, heating the tube edges to hot forging temperature. The tube edges are then forged by squeeze rolls which drive the molten edges of the open seam tube together to form an integral seam.

In-line galvanizing and coating or painting processes which apply a protective coating to the tube are also well known. The strip may be galvanized or painted on one or both sides prior to forming and welding, or the outer surface of the welded seamed tube may be galvanized by immersing the tube in a molten zinc bath. Where the strip is coated with a protective coating prior to seam welding, the coating on the seam area will burn-off or vaporize because the welding operation involves the melting of the tube material, which is generally steel. The temperature of the adjacent edges of the open seam tube are heated to melting temperature of steel, which is 2300° F. or greater. Where the strip is coated with protective metal coating, such as zinc or aluminum, the protective metal coating will melt and vaporize during welding and the protective metal coating near the weld will flow away from the seam, which is located at the top of the tube in a conventional tube mill. Zinc coating solutions have also been used to "paint" the exterior surface of the seam. However, such coatings have poor adherence and are mainly cosmetic. "Metallizing" of the seam surface has also been attempted; however, such coatings are mainly mechanical and do not provide a metallurgical bond between the protective metal coating and the steel tube. The failure of the prior commercial processes to fully coat and thus protect the tube seam is evident by the fact that the welded area is generally the first to fail in accelerated corrosion tests. Metallized surfaces covering the exterior seam surfaces have been known to fail because of mechanical stresses associated with tube fabrication.

The improved method of coating the seam surfaces of a welded tube of this invention assures complete coating of the outer and inner surface of the seam of a welded metal tube and a metallurgical bond between the protective metal coating on the exterior surface of the weld in a continuation or in-line process utilizing conventional tube forming processes and coating equipment.

SUMMARY OF THE INVENTION

The improved method of coating the seam of a welded metal tube of this invention utilizes a unique two step heating and coating process which results in a metallurgical bond between the protective metal coating and the external surface of the weld and full coating of the internal surface which reduces or eliminates failure of the tube in the seam area. The method of this invention is particularly, but not exclusively adapted to a continuous or in-line tube forming process wherein the strip or skelp is coated on one or both surfaces with a protective metal coating prior to forming and welding. Wherein the tube is formed of steel, for example, the protective metal coating is preferably formed of zinc, aluminum, copper, their alloys or other metals or alloys which have a melting temperature substantially below the melting temperature of the tube material. Zinc is the most common protective coating for ferrous tubes which is typically alloyed with from about 0.05% to about 0.125% by weight aluminum. However, as described above, when the edges of the open seam tube are welded together, the protective metal coating in the weld area is burned off or vaporizes leaving exposed weld areas on the interior and exterior surfaces. Further, the remaining zinc on the surface of a steel or iron tube adjacent the weld is galvanealed forming an alloy of iron or steel and zinc produced by the extreme heat of the welding process. The galvanealed coating prevents or inhibits the application of subsequent zinc coating which is metallurgically bonded to the iron or steel substrate.

The method of applying a protective metal coating on the welded seam of a seamed metal tube of this invention includes first heating the seam area only of the metal tube following welding to a first temperature less than the melting temperature of the protective metal coating, applying the metal coating over the seam and then heating the entire tube with the seam located in a lower portion of the tube where the coating is applied to the inner seam surface to a second temperature, which is at least equal to the difference between the first temperature and the melting temperature of the metal coating. The seam area is thus heated to a temperature equal to or greater than the melting temperature of the metal coating, whereby the metal coating melts and adheres to the seam area, protecting the seam area. A flux is preferably applied to the seam area either prior to the application of the protective metal coating or with the metal coating where the metal coating is applied in the form of a fine powder on the inside surface of the seam as described below.

Where the metal strip which forms the tube (generally formed of iron or steel) is coated with a protective metal coating (usually zinc) prior to forming and welding the tube, it is important in the method of this invention to remove the metal coating from adjacent the weld area prior to welding to avoid galvanealing of the remaining zinc adjacent the weld which would prevent or inhibit the flow and the bonding of a zinc coating applied to the galvanealed surface. The presence of zinc and other protective metal coating at the surfaces of the metal tube to be welded may also inhibit or prevent the formation of a good weld between the adjacent edges of the open seam tube. Thus, the protective metal coating is first removed or scarfed from the adjacent lateral edges of the strip prior to welding to prevent galvanealing of the zinc adjacent the edges during welding. The preferred width of the exposed areas of the strip adjacent the lateral edges will depend upon the thickness and diameter of the tube, the speed of the line and the means used to heat the lateral edges prior to welding. Where the welding heat can be localized, the exposed areas can be relatively small. However, it is important to avoid substantial galvanealing of the zinc adjacent the weld area to form a good metallurgical bond between the zinc applied to the exterior surface of the weld area in the method of this invention.

The order or sequence of the steps of the method of this invention will depend upon the application. The preferred method of heating the tube with the two stage heating method in the process of this invention is by induction heaters. In the first stage, the induction heater is preferably located adjacent the weld area, most preferably by one or more induction heaters arranged generally tangential to the circumference of the tube in spaced relation to the tube. The seam area is preferably first heated to a temperature of between 100° F. and 600° F. or more preferably between 200° F. and 300° F. As described more fully hereinbelow, if the seam area were heated in this stage to a temperature greater than the melting temperature of the protective metal coating, the induction heater or heaters would repel the metal coating because the electromagnetic flux lines of an induction heater are radial. In the second stage of the heating process in the method of this invention, the entire tube is preferably heated with a full body induction coil, most preferably an induction coil which is spirally wound around the tube, wherein the electromagnetic flux lines of the full body coil extend axially relative to the tube, such that the metal coating is not disturbed during heating.

As set forth above, the sequence of the steps of the method of coating the welded seam of a metal tube of this invention will depend upon the application. Where the method of this invention is utilized to coat the exterior surface of the weld area, the protective metal coating is preferably applied by a thermal spray process, most preferably a two wire arc metallizing process after the initial heating step. Following forming and welding of the seam, the exterior weld area is scarfed to remove the weld flash and wire brushed to remove the metal oxide and roughen the seam area. The welded seam area is then heated preferably with an induction heater to a first temperature of between 100° F. and 600° F. before applying the protective metal coating with a thermal spray apparatus, wherein molten metal is sprayed onto the weld area. Finally, as described above, the entire tube is then heated preferably by a full body induction coil, such that the weld area is heated to a temperature equal to or preferably above the melting temperature of the protective metal coating. This process results in a metallurgical bond between the protective metal coating and the exposed exterior surface of the weld area of the tube. As described, the method of coating the welded seam of this invention may be utilized with a continuous or in-line tube forming process, wherein a flux is preferably applied to the exterior surface of the weld area before applying the protective metal coating, most preferably before the initial heating of the weld area following wire brushing.

The preferred method of coating the interior surface of the weld area with a protective metal coating of this invention may be utilized in combination with the method of coating the exterior surface described above in an in-line process or the methods may be used independently to coat either the interior or exterior surface of the weld. In the most preferred process of coating the interior surface of the seam, the tube is welded with the seam located in the lower portion of the tube, most preferably near the bottom. However, it is also possible to weld the seam in the upper portion of the tube as is presently done in conventional tube forming mills and then "locating" the weld in the lower portion of tube during the final stages of the seam coating process of this invention utilizing a conventional tube twisting apparatus, for example. In the most preferred method of coating the interior surface of the weld area of this invention, where the strip is precoated with a protective metal coating such as zinc or zinc alloy, the lateral edges of the strip are precut to expose the edges of the tube to be welded and to form a well for receipt of the protective metal coating. The protective metal coating on the strip may also be thicker adjacent to but spaced from the edges of the strip, such that the protective metal coating will melt and flow downwardly over the seam during the two stage heating of the method of this invention. During heating of the weld area in the lower portion of the tube to a temperature above the melting temperature of the metal coating, the coating metal adjacent the seam will melt and flow downwardly over the seam.

It has been found, however, that in the most preferred method of coating the interior surface of the seam of this invention, additional coating material should be added to the interior surface of the weld area prior to heating the weld area above the melting temperature of the protective metal coating to assure complete coating of the weld area. The additional coating material may be added in the form of a strip or foil laid over the interior surface of the weld area wherein a flux is preferably first applied to the weld area prior to application of the additional protective metal coating material. In the most preferred method of coating the interior surface of the weld area of this invention, however, the additional coating material is applied by spraying the interior surface of the weld area with the protective metal coating is in the form of a fine metal powder and entrained in a flux. The weld area is then heated to a temperature less than the melting temperature of the protective metal coating, preferably with an induction heater as described above. Finally, the entire tube is heated, preferably with a full body induction coil, wherein the lower portion of the tube including the weld area is heated to a temperature equal to or greater than the melting temperature of the protective metal coating, such that the metal coating material added to the interior surface of the weld melts and adheres to the seam area. Where the metal strip which forms the tube is precoated, as described above, the additional coating material applied to the interior surface of the weld also bonds to the adjacent coating on the precoated strip.

Thus, the coating material added to the weld area is preferably metallurgically compatible with the coating on the strip. For example, where the coating on the strip is zinc or a zinc alloy as described above, the metal coating material added to the interior surface of the weld area is also zinc or a zinc alloy. In the most preferred method of this invention where the coating material on the strip is thicker adjacent to but spaced from the weld area, this additional coating material on the strip will also melt and flow downwardly over the seam and alloy with the coating material added to the weld area. In either embodiment, however, where the seam is located in the lower portion of the tube, the metal coating on the strip will melt and flow downwardly to join the coating material added to the interior surface of the weld. Where only the exterior of the weld area is coated by the process of this invention, the location of the weld area (i.e., top or bottom) is not critical to the invention.

Other advantages and meritorious features of the method of coating the welded seam of a metal tube with a protective metal coating of this invention will more fully understood from the following description of the preferred embodiments of this invention, the claims and the drawings, a brief description of which follows.

DESCRIPTION OF THE PREFERRED EMBODIMENTS

Figure 2:
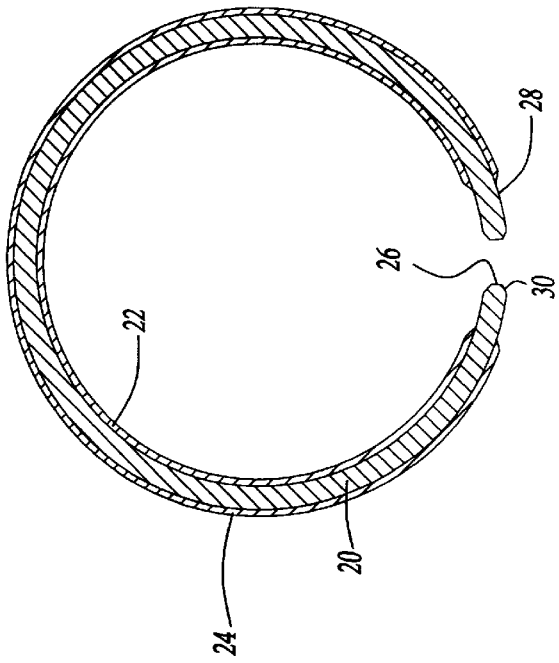
FIG. 2 is a cross-section of a preferred embodiment of a precoated open seam tube prior to welding.

As set forth above, the method of coating the welded seam of a metal tube with a protective coating of this invention may be used in a continuous or in-line tube forming process. The tube 20 as received by the process of this invention is an open seam tube as shown in FIG. 2. In a typical tube forming mill, a flat metal strip or skelp is received by the tube forming mill, which is typically steel or iron. It should be understood, however, that the coating method of this invention may also be utilized with non-ferrous metal tubes including, for example, brass. The metal strip is supplied to the tube forming mill in coils mounted on a payout reel (not shown) which is then treated, cleaned and rolled by conventional means into an open seam tube 20. In a conventional tube forming mill, however, the open end of the tube is located at the top and the tube is welded with the seam located at the top.

The coating method of this invention may also be used with precoated metal strips having a protective metal coating on one or both surfaces of the strip having a melting temperature substantially below the melting temperature of the tube, including for example zinc, aluminum, copper, their alloys and other metals or alloys. Zinc is the most common protective coating for ferrous tubes. When zinc is used as the metal coating, it is typically alloyed with aluminum as described above. In the disclosed preferred embodiment, both surfaces of the tube include a protective metal coating, including an interior protective metal coating 22 and an exterior metal coating 24. As shown in FIG. 2, the opposed ends 26 of the tube are preferably exposed and flattened prior to welding by removing the metal coating from the edges of the strip. Further, as described more fully hereinbelow, the protective metal coating adjacent the opposed ends 26 of the tube is preferably removed as shown at 28 leaving exposed substrate at both ends of the strip. Further, the edges of the strip are preferably angled or chamfered as shown at 30 providing a well for receipt of the added metal coating material particularly on the inside of the tube, as described below.

In the preferred coating method of this invention, the open seam tube 20 is welded in a non-oxidizing atmosphere and it is particularly important to maintain a non-oxidizing atmosphere within the interior of the tube to promote reflow of the protective metal coating over the interior of the weld area. This is accomplished by enclosing the weld area within an enclosure 32 and injecting non-oxidizing gas into the interior of the tube. As used herein, a non-oxidizing gas or atmosphere refers to a gas or atmosphere which eliminates, prevents or inhibits oxidation of the molten metal including the molten edges of the tube and the coating. The non-oxidizing gas may include a reducing gas, wherein the reducing gas reacts with the metal oxides found on the metal strip at elevated temperatures, thereby effectively removing oxides from the strip surface in preparation for reflow of the metal coating. The non-oxidizing gas may also keep the metal oxides from forming at elevated temperatures. Thus, the gas or atmosphere may be relatively inert, such as nitrogen or an inert gas, but may also include a reducing gas, such as hydrogen or hydrogen may be used as the non-oxidizing gas. A typical non-oxidizing atmosphere may thus include nitrogen and hydrogen alone or in combination. The atmosphere in the enclosure 32 should also be kept from reaching chemical equilibrium by allowing the non-oxidizing gas to escape the enclosure, preferably past the open ends of the strip.

In the disclosed embodiment, the open seam tube 20 is received through a gas seal 34 having an inner plug (not shown) formed of a friction resistant material, such as a thermoset plastic or ceramic including reinforced nylon which closely receives the open seam tube. A gas port 36 extends through the support portion of the plug body having an outlet which injects a non-oxidizing gas into the open seam tube. Line 38 receives a non-oxidizing gas from source 40. Line 42 is also connected to the source of non-oxidizing gas 40 to inject non-oxidizing gas into the enclosure 32. Finally, non-oxidizing gas may be injected into impeder 44 through line 46. Thus, in the disclosed embodiment of the apparatus, the interior and exterior of the tube are maintained in a non-oxidizing atmosphere during welding.

Figure 1:
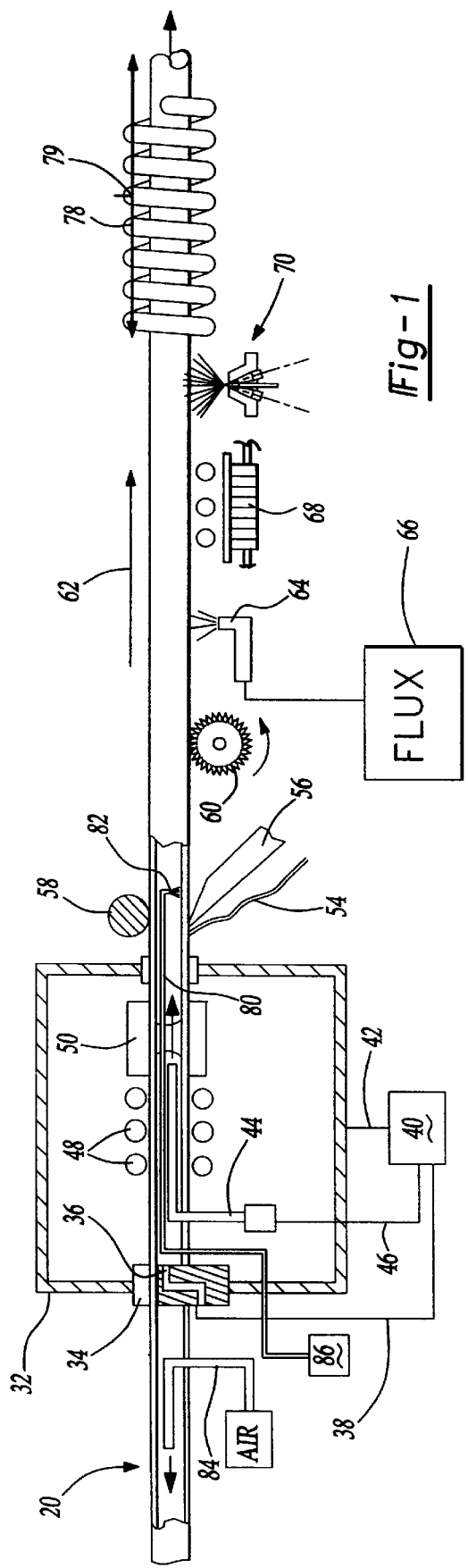
FIG. 1 is a partially schematic flow diagram illustrating a preferred embodiment of a continuous process of coating the interior and exterior surfaces of the welded seam with a protective metal coating of this invention.
Figure 3:
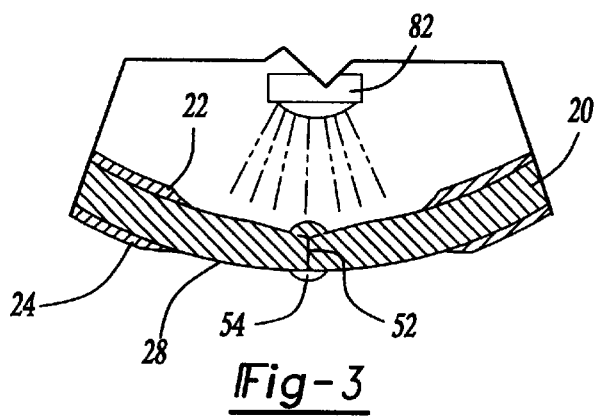
FIG. 3 is a partial cross-section of the lower portion of the tube shown in FIG. 2 following welding illustrating one preferred method of applying additional coating material to the interior surface of the tube.

The open seam tube 20 may then be welded by any conventional welding method while preferably maintaining a non-oxidizing atmosphere at least within the interior of the tube. In the disclosed embodiment, the welding apparatus includes a work coil 48 which is connected to a source of high frequency alternating current (not shown). The work coil 48 creates a strong magnetic field which in turn induces current in the open seam tube adjacent the work coil. The impeder 44 is located within the open seam tube 20. The impeder 44 extends upwardly between the opposed adjacent edges 26 of the open seam tube 20. A conventional induction welding impeder consists of a non-metallic tube surrounding one or more ferrite rods. Water or mill coolant is generally circulated over and past the ferrite rods to remove the heat produced by the magnetic hysteresis and eddy current losses. At the frequencies commonly used for induction welding (typically 200 to 800 kHz), current flows around the tube and along the "Vee" formed by the approaching edges 26 of the strip, heating the edges to a hot forging temperature, whereby the edges are at least partially melted. As will be understood by those skilled in the art, ferrous tubes are also being welded at lower frequencies down to 60 kHz. The lower the frequency, the wider the zone of the tube is heated. In the process of this invention, however, its is preferable to limit the zone heated above the melting temperature of the coating to reduce coating loss. The edges are then forged together in the disclosed process by squeeze rolls 50, one of which is shown in FIG. 1, thereby forming an integral seam 52 having upstanding flashes 54 as shown in FIG. 3. Where the strip is steel, for example, the temperature of the edges of the strip will reach about 2300° F. to 2600° F. or greater during the welding step, vaporizing any protective metal coating such as zinc or a zinc aluminum alloy having a melting temperature from about 825° F. to about 875° F. at or adjacent the weld area.

A further improvement of the method of coating the seams of a welded tube of this invention results from the removal of the metal coating adjacent the ends 26 of the strip as shown at 28 in FIG. 2. As described above, the zinc adjacent the weld area on a ferris tube which is not completely vaporized will galvaneal or form an alloy of iron or steel and zinc which is produced by heating a surface already galvanized with zinc. As described above, the opposed ends 26 of the tube will be heated to a temperature of 2300° F. to 2600° F. or greater during the welding process. The galvanealed coating, however, prevents the metallurgical bonding of a further coating to the iron or steel base metal such that a zinc coating applied to the galvanealed coating will not adequately bond to the weld area. The preferred width of the exposed areas 28 of the tube adjacent the ends 26 will depend upon several factors including, for example, the thickness and diameter of the tube, the welding method used and the speed of the line. In the preferred method of this invention, the welding heat is localized adjacent the ends by using high frequency induction. In a typical application where the tube has a diameter of 1.7 inches and a thickness of 0.045 inches, the exposed areas are preferably about 0.1 inches. Where a protective coating is removed from the opposed edges of the strip as described herein, galvanealing is prevented such that the protective metal coating added to the weld area bonds directly to the substrate of the metal tube.

The outer flash 54 is then removed with a scarfing tool 56, as shown in FIG. 1, which conventionally includes an opposed backup roller 58 as shown. In typical application, the flash 54 on the exterior of the tube may be more easily removed by the scarfing tool 56 while the weld area is relatively hot and the tube is then quenched (not shown) to a much lower temperature. The requirement for a quench will depend upon the speed and length of the line. However, the temperature of the tube is preferably reduced to near ambient before wire brushing described below.

As set forth above, the coating method of this invention may be utilized to coat the welded seam of a tube on either or both the interior or exterior surfaces. Further, the method of this invention may be utilized in a continuous or in-line tube forming mill, but may also be used in a batch process if desired. For ease of reference, however, the method of coating the exterior and interior surfaces of the welded seam will now be described separately, starting with the description of the method of coating the exterior surface of the welded seam.

Figure 5:
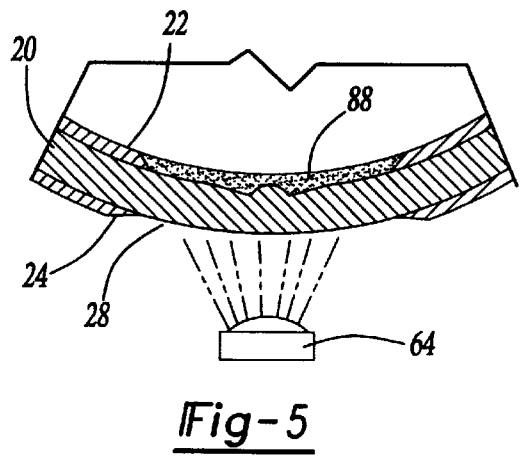
FIG. 5 is a partial cross-section of the lower portion of the tube similar to FIGS. 3 and 4 illustrating application of flux material to the exterior surface of the weld area.

Following scarfing of the exterior weld flash 54 by scarfing tool 56, as shown in FIG. 1, the exterior surface of the weld area is preferably wire brushed by wire brush 60 which removes an additional layer of potentially oxidized metal which may be detrimental to the application of the additional metal coating and reflow. As shown, the wire brush 60 preferably rotates in a counterclockwise direction against the direction of movement of the tube through the mill as shown by arrow 62. The wire brush thus serves as a cold scarfing process step. However, in the alternative, the method of this invention may utilize any method which removes the outer oxide layer, including grinding and abrading, which preferably removes the outer oxide layer when the tube is relatively cold. A flux is then preferably sprayed on the exterior surface of the seam area after wire brushing or cold scarfing. As shown in FIGS. 1 and 5, a spray nozzle 64 directs a fine spray of a suitable flux onto the exterior surface of the weld area. The nozzle 64 is connected to a source of liquid flux 66. A suitable flux contains zinc chloride, such as Johnson Soldering Fluid, available from Johnson Manufacturing. The flux is sprayed or misted onto the outside welded surface, such as by blowing the flux with air or a non-oxidizing gas creating a fine spray or mist. The flux reduces any oxides at the outside weld surface and provides a surface which will more readily receive the metal coating which is to follow.

Figure 6:
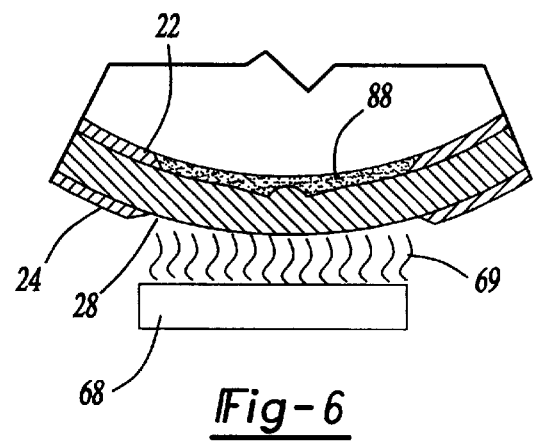
FIG. 6 is partial cross-section of the lower portion of the tube similar to FIGS. 3 to 5 illustrating the first heating step.

The next step in the method of coating the exterior surface of the weld area of this invention is to heat the weld area, which in the preferred embodiment of this invention is located at the lower portion of the tube because the disclosed process combines coating both the exterior surface of the weld area and the interior surface, where the weld area should be located in a lower portion of the tube. Where the process of this invention is used only to coat the exterior seam surface, the seam may be located in any position. In the disclosed and preferred embodiment of the apparatus of this invention, the lower portion of the tube is then preheated by an induction heater 68 as shown in FIGS. 1 and 6. The weld area is heated to a temperature less than the melting temperature of the protective coating, preferably to a temperature of between 100° F. to 600° F. or more preferably between 200° F. to 500° F. In a typical application, the tube seam is heated to a temperature of between about 200° F. to 300° F. prior to application of the metal coating to the exterior surface of the weld area.

Figure 7:
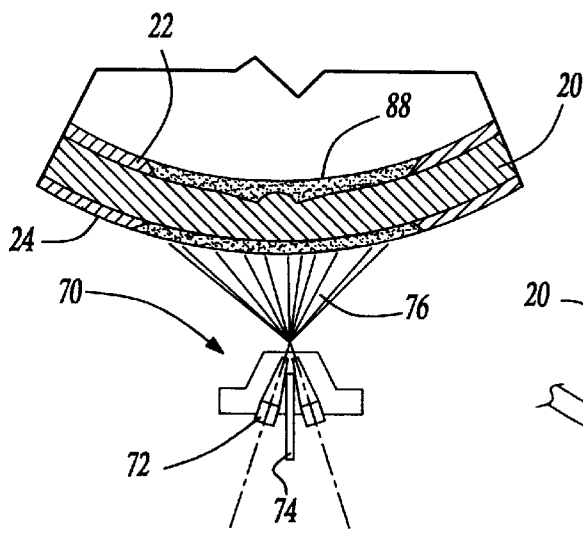
FIG. 7 is a partial cross-sectional view of the lower portion of the tube illustrating a preferred method of applying coating material to the exterior of the weld area using a two wire arc thermal spray apparatus.

The protective metal coating is then applied to the exterior surface of the weld area preferably by thermal spraying atomized molten metal coating material as shown in FIGS. 1 and 7. In the most preferred embodiment of this method, the thermal spray apparatus 70 is a two wire arc thermal spray apparatus, wherein consumable electrodes 72 of the coating material are fed into the gun, an electric arc is struck across the approaching ends of the electrodes, melting the ends of the electrodes. A gas, such as air, is fed through tube 74, atomizing the molten metal, which is then sprayed onto the exterior surface of the weld as shown at 76. Conventional two wire arc thermal spray apparatus of the type shown in FIG. 7 are widely available commercially. It is believed, however, that other thermal spray apparatus would also be suitable for the method of coating the exterior welded seam including, for example, a HVOF flame spray apparatus and a plasma spray apparatus.

Figure 8:
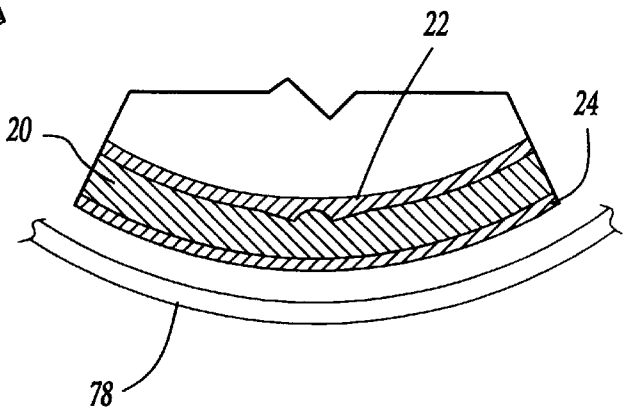
FIG. 8 is a partial cross-sectional view of the lower portion of the tube similar to FIGS. 3 to 7 illustrating the final heating step.

The final step in the method of coating the exterior surface of a welded seam of a metal tube of this invention is to heat the entire tube, preferably with a full body induction coil, most preferably a spirally wound induction coil 78 as shown in FIG. 1. The induction coil 78 then heats the entire tube to a temperature equal to or greater than the difference between the first temperature of the lower portion of the tube, resulting from the preheating by the induction coil 68, and the melting temperature of the protective metal coating applied by the thermal spray apparatus 70. The weld area is thus heated to a temperature equal to or greater than the melting temperature of the protective metal coating, thereby forming a metallurgical bond between the metal coating and the weld area of the exposed welded seam as shown in FIG. 8. Others have proposed thermal spraying or metallizing the surface of a tube. However, such methods have not resulted in a metallurgical bond between the protective metal coating and the exposed weld area of the tube. The two stage heating process of this invention in combination with metallizing over the exposed surfaces 28 of the tube adjacent the weld area results in a metallurgical bond between coating and the tube. The second heating step following metallizing results in further melting of the protective metal coating on the exposed area of the seam and in a metallurgical bond with the tube. It is also possible to cause the exterior protective metal coating 24 applied to the strip to flow downwardly upon heating where the seam is located in a lower portion of the tube as shown, thereby forming a continuous protective metal coating covering the entire exterior surface of the tube including the weld area. Thus, it is preferred that the metal coating material added to the exterior surface of the weld area by the thermal spray apparatus 70 be metallurgically compatible with the protective metal coating material 24 applied to the strip. In the most preferred application, the protective metal coating materials are the same or alloys of the same metal.

Figure 4:
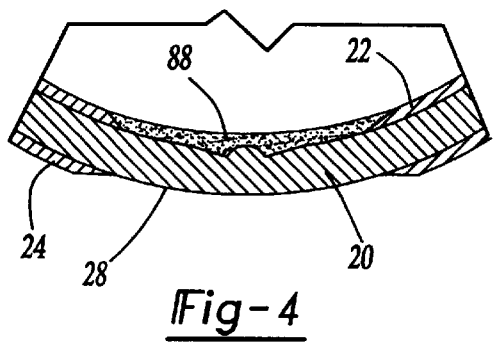
FIG. 4 is a partial cross-section of the lower portion of the tube similar to FIG. 3 following application of the additional coating material to the interior surface of the tube.

The method of coating the inside surface of the weld area of this invention will now be described. Protective metal coating material and flux are preferably applied to the interior surface of the weld area as shown in FIGS. 1 and 3. In the disclosed embodiment of the apparatus, fine powdered metal coating material is conveyed through wand 80 to a nozzle 82 located downstream of the welding enclosure 32. The wand 80 is connected by line 84 to a source of powdered coating material 86. In the most preferred embodiment, the powdered coating material is entrained in a liquid flux, such that the powdered coating material and flux are sprayed together through nozzle 82 onto the interior surface of the weld area as shown at 88 in FIG. 4. The liquid flux may be any suitable liquid flux of the general type described above. The wand 80 is received through the opening between the ends 26 of the open seam tube and extends through the tube downstream to a point where the temperature of the weld area is well below the melting temperature of the metal coating material. As set forth above, the temperature of the tube prior to wire brushing may be reduced by a conventional quenching step prior to application of the coating material through nozzle 82. It will be understood by those skilled in the art that FIG. 1 is intended to be schematic and is not drawn to scale. It may also be possible in certain applications to eliminate the preheating step by lowering the temperature of the weld area to below the melting temperature of the protective metal coating within the ranges described herein.

The next step in the method of coating the interior surface of the weld area with a protective metal coating is to heat the lower portion of the tube including the weld area with the induction heater shown at 68 as described above. It is important to note that in the application of the protective metal coating to the interior surface of the weld area, it is not advisable to heat the metal coating to above the melting temperature of the metal coating using an induction heater 68 generally tangential to the circumference of the tube because the electromagnetic lines of flux 69 are radial as shown in FIG. 6. If heated to the melting temperature by the preheater 68, the powdered metal coating material would be driven out of the seam area. Finally, as described above, the entire tube is then heated preferably by the full body coil 78 to a temperature equal to or greater than the difference between the temperature of the weld area and the melting temperature of the protective metal coating material. Thus, the weld area, which is located in the lower portion of the tube, is heated to a temperature equal to or preferably above the melting temperature of the protective metal coating. However, because the flux lines 79 of the full body coil 78 (see FIG. 1) are axial with respect to the tube, the powdered metal coating material is not disturbed during melting. The powdered protective metal coating 88 over the interior surface of the weld area is thus melted and flows over the seam. As shown, the chamfered edges 30 also provide a well for receipt of the added metal coating. Further, because the weld area is located in the lower portion of the tube, the coating material adjacent the weld area may also melt and flow downwardly to be joined metallurgically to the melted metal coating material 88. Thus, as set forth above, the added coating material 88 is preferably the same metal or an alloy of the same metal, such that the protective metal coating material will be continuous over the interior surface of the tube.

Having described the preferred embodiments of the method of coating the welded seam of a metal tube with a protective metal coating of this invention, it will be understood by those skilled in the art that various modifications may be made within the purview of the following claims. The methods of coating the interior and exterior surfaces of the weld area described above generally comprise the same steps. However, the sequence of the steps may be different because the coating material added to the interior of the tube through nozzle 82 requires a wand received through the open "Vee" of the open seam tube. Further, as described above, the coating material applied to the interior surface of the weld area may be in the form of a strip or foil which is either applied to the strip or received through the "Vee" of the open seam tube, in which case the preferred embodiment would include applying a flux material before receipt of the ribbon or strip of added protective metal coating material over the interior surface of the weld area. It is believed that the weld area of the tube may also be heated by other suitable heating means including, for example, high frequency and radiant heaters, although it would be more difficult to limit the heat to the weld area which is advantageous to the method of this invention. Also, where the method of this invention is used only to coat the exterior of the seam, the welded seam may be located in an upper portion of the tube. Finally, the method of coating the seam area with a protective metal coating may be utilized for coating the seam of tubes having special cross-sections including, for example, square and rectangular tubes and the tube may be welded by any conventional means including AC or DC welding apparatus known in the art and flux welding.

Having described the coating method of this invention, the invention is now claimed, as follows.

What is claimed is:

1. A method of applying a protective metal coating on the welded seam of a seamed metal tube, comprising the following steps:

heating the seam area only of said metal tube to a first temperature less than the melting temperature of said protective metal coating;

applying said protective metal coating over said seam; and heating the entire tube to a second temperature at least equal to the difference between said first temperature and said melting temperature of said metal coating, whereby the temperature of said seam area is heated to a temperature equal to or greater than said melting temperature of said metal coating, whereby said metal coating firmly adheres to said welded seam.

2. The method of applying a protective metal coating on the welded seam of a seamed metal tube as defined in claim 1, wherein said method includes applying a flux to said seam area.

3. The method of applying a protective metal coating on the welded seam of a seamed metal tube as defined in claim 1, wherein said method includes heating said seam area to said first temperature with an induction heater adjacent said weld area.

4. The method of applying a protective metal coating on the welded seam of a seamed metal tube as defined in claim 1, wherein said method includes heating said tube to said second temperature with a full body induction coil surrounding said tube.

5. The method of applying a protective metal coating on the welded seam of a seamed metal tube as defined in claim 1, wherein said method includes heating said tube with a full body induction coil spirally wound around said tube.

6. The method of applying a protective metal coating on the welded seam of a seamed metal tube as defined in claim 1, wherein said method includes applying said metal coating to an inside surface of said welded seam by spraying metal powder and a liquid flux over said inside surface of said welded seam and heating said entire tube with said weld seam located in a lower portion of said tube.

7. The method of applying a protective metal coating on the welded seam of a seamed metal tube as defined in claim 6, wherein said method includes spraying said metal powder and liquid flux over said inside surface of said seam, then heating said seam area to said first temperature.

8. The method of applying a protective metal coating on the welded seam of a seamed metal tube as defined in claim 1, wherein said method includes applying said metal coating to an outer surface of said welded seam by thermally spraying a molten metal coating over said outer surface of said seam, followed by heating said tube to said second temperature.

9. The method of applying a protective metal coating on the welded seam of a seamed metal tube as defined in claim 8, wherein said method includes spraying a liquid flux over said outer surface of said seam before thermal spraying said molten metal coating over said outer surface of said welded seam.

10. The method of applying a protective metal coating on the welded seam of a seamed metal tube as defined in claim 8, wherein said method includes thermal spraying said molten metal coating over said outer surface of said welded seam after heating said seam to said first temperature.

11. The method of applying a protective metal coating on the welded seam of a seamed metal tube as defined in claim 8, wherein said method includes thermal spraying said outer surface of said welded seam with a two wire arc thermal spray apparatus, said method including feeding wire electrodes of said metal coating, melting said wire electrodes and propelling atomized molten metal coating over said outer surface of said welded seam.

12. A method of coating the welded seam of a moving welded metal tube with a protective metal coating, said tube having a surface coated with said protective metal coating excluding areas adjacent to said welded seam, comprising the following steps:

applying a flux to said welded seam area;

heating an area including said welded seam only to a first temperature less than the melting temperature of said protective metal coating;

applying said protective metal coating to said welded seam; and heating the entire tube to a second temperature at least equal to the difference between said first temperature and said melting temperature of said protective metal coating, whereby said welded seam area is heated to a temperature equal to or greater than said melting temperature of said protective metal coating, whereby said protective metal coating melts and bonds to said welded seam and said adjacent protective metal coating on said surface of said tube.

13. The method of coating the welded seam of a moving welded metal tube with a protective metal coating as defined in claim 12, wherein said method includes heating said seam area to said first temperature with an induction heater located adjacent said weld area to a temperature of between 100° F. and 600° F.

14. The method of coating the welded seam of a moving welded metal tube with a protective metal coating as defined in claim 12, wherein said method includes heating said tube to said second temperature with a full body induction coil surrounding said tube.

15. The method of coating the welded seam of a moving welded metal tube with a protective metal coating as defined in claim 12, wherein said method includes heating said tube with a full body induction coil spirally wound around said tube.

16. The method of coating the welded seam of a moving welded metal tube with a protective metal coating as defined in claim 12, wherein said method includes applying said protective metal coating to said welded seam area by thermally spraying a molten metal coating over an outer surface of said welded seam area after heating said welded seam area to said first temperature.

17. The method of coating the welded seam of a moving welded metal tube with a protective metal coating as defined in claim 16, wherein said method includes thermally spraying said outer surface of said seam with a two wire arc thermal spray apparatus, said method including feeding wire electrodes of said metal coating, melting said wire electrodes and propelling atomized molten metal coating over said outer surface of said welded seam.

18. The method of coating the welded seam of a moving welded metal tube with a protective metal coating as defined in claim 12, wherein said method includes applying said metal coating to an inside surface of said seam by spraying metal powder and a liquid flux over said inside surface of said seam and heating said entire tube with said seam area located in a lower portion of said tube.

19. The method of coating the welded seam of a moving welded metal tube with a protective metal coating as defined in claim 18, wherein said method includes spraying said metal powder and liquid flux over said inside surface of said seam, then heating said seam area to said first temperature.

20. A method of coating the exterior surface of a welded seam of a seamed metal tube with a protective metal coating having a melting temperature substantially lower than the melting temperature of said metal tube, said method comprising the following steps:

applying a flux over said exterior surface of said welded seam;

heating said welded seam area only to a first temperature less than said melting temperature of said protective metal coating;

thermally spraying said protective metal coating as a molten metal over said exterior surface of said welded seam; and heating the entire tube to a second temperature at least equal to the difference between said first temperature and said melting temperature of said metal coating whereby said seam area is heated to a temperature equal to or greater than said melting temperature of said protective metal coating, whereby said protective metal coating melts and metallurgically bonds to said external surface of said welded seam.

21. The method of coating the exterior surface of a welded seam of a seamed metal tube with a protective metal coating as defined in claim 20, wherein said method includes heating said welded seam area to said first temperature with an induction heater located adjacent said welded seam before thermally spraying said protective metal coating over said exterior surface of said welded seam.

22. The method of coating the exterior surface of a welded seam of a seamed metal tube with a protective metal coating as defined in claim 20, wherein said method includes heating said entire tube to said second temperature with a full body induction coil surrounding said tube.

23. The method of coating the exterior surface of a welded seam of a seamed metal tube with a protective metal coating as defined in claim 20, wherein said method includes heating said entire tube to said second temperature with a full body induction coil spirally wound around said tube.

24. The method of coating the exterior surface of a welded seam of a seamed metal tube with a protective metal coating as defined in claim 20, wherein said method includes scarfing excess metal from said exterior surface of said seam prior to applying said flux over said external surface of said welded seam.

25. The method of coating the exterior surface of a welded seam of a seamed metal tube with a protective metal coating as defined in claim 24, wherein said method includes brushing said external surface of said welded seam after scarfing excess metal from said external surface of said seam.

26. A method of applying a protective metal coating over the internal surface of a welded seam of a metal tube comprising the following steps:

applying a metal coating material over said internal surface of said welded seam of said metal tube with said welded seam located in a lower portion of said tube;

heating said lower portion of said tube only to a first temperature less than the melting temperature of said metal coating material;

heating the entire tube to a second temperature at least equal to the difference between said first temperature and said melting temperature of said metal coating material whereby said internal surface of said welded seam is heated to a temperature equal to or greater than said melting temperature of said metal coating material, thereby melting said metal coating material over said internal surface of said welded seam.

27. The method of applying a protective metal coating over the internal surface of a welded seam of a metal tube as defined in claim 26, wherein said method includes applying a metal coating material over said internal surface of said welded seam by spraying particles of metal coating material and a liquid flux over said internal surface of said welded seam.

28. The method of applying a protective metal coating over the internal surface of a welded seam of a metal tube as defined in claim 26, wherein said method includes heating said lower portion of said tube to said first temperature with an induction heater located adjacent said weld area after applying said metal coating material over said internal surface of said welded seam.

29. The method of applying a protective metal coating over the internal surface of a welded seam of a metal tube as defined in claim 27, wherein said method includes heating said lower portion of said tube to a temperature of between 100° F. and 600° F.

30. The method of applying a protective metal coating over the internal surface of a welded seam of a metal tube as defined in claim 26, wherein said method includes heating said tube to said second temperature with a full body induction coil surrounding said tube.

31. A method of coating the exterior surface of a welded metal tube including the weld area with a protective metal coating, comprising the following steps:

coating at least one surface of a metal strip having opposed lateral edges with a protective metal coating excluding areas adjacent said lateral edges, such that said areas of said metal strip adjacent lateral edges are exposed;

forming said strip into an open seam tube with said protective metal coating on an outside surface of said tube with said lateral edges in adjacent spaced relation;

heating said lateral edges of said open seam tube to the forging temperature of said metal tube and welding said lateral edges to form a continuous tube having a welded seam, an exterior protective metal coating spaced from said welded seam and exposed areas of said tube adjacent to and spaced from said welded seam;

thermally spraying molten atomized particles of a protective metal coating over said welded seam and said exposed areas of said tube adjacent said welded seam; and heating said welded seam and the areas of said tube adjacent said seam to a temperature equal to or greater than the melting temperature of said protective metal coating, thereby melting said thermally sprayed protective metal coating and forming a metallurgical bond between said thermally sprayed metal coating and said tube.

32. The method of coating the exterior surface of a welded metal tube with a protective metal coating as defined in claim 31, wherein said method includes scarfing excess metal from the exterior surface of said seam, then applying a liquid flux over said exterior surface of said seam and said exposed area of said tube adjacent said welded seam prior to thermally spraying molten atomized particles of a protective metal coating over said welded seam and said exposed areas of said tube adjacent said welded seam.

33. The method of coating the exterior surface of a welded metal tube with a protective metal coating as defined in claim 31, wherein said method includes heating said seam and the adjacent exposed surfaces of said tube adjacent said seam with an induction heater.

34. The method of coating the exterior surface of a welded metal tube with a protective metal coating as defined in claim 31, wherein said method includes heating said welded seam and the areas of said tube adjacent said seam in two stages, comprising first heating said welded seam and said exposed areas of said tube adjacent said welded seam to a first temperature less than the melting temperature of said protective metal coating, then heating the entire tube to a second temperature at least equal to the difference between said first temperature and said melting temperature of said protective metal coating, thereby at least partially melting said thermally sprayed protective metal coating is heated to a temperature equal to or greater than said melting temperature of said protective metal coating, whereby said thermally sprayed protective metal coating and metallurgically bonding said coating to said welded seam and said areas adjacent said welded seam.

35. The method of coating the entire surface of a welded metal tube with a protective metal coating as defined in claim 34, wherein said method includes first heating said welded seam and said area of said tube adjacent said seam to said first temperature prior to thermally spraying molten atomized particles of a protective metal coating over said welded seam.

36. The method of coating the exterior surface of a welded metal tube with a protective metal coating as defined in claim 34, wherein said method includes heating the entire tube to said second temperature with a full body induction coil surrounding said tube.

* * * * *